United States Patent [19]

Furuta

[11] 4,060,818
[45] Nov. 29, 1977

[54] SWITCH OPERATING DEVICE OPERATIVELY ASSOCIATED WITH A RECIPROCALLY MOVABLE MEMBER

[75] Inventor: Koichi Furuta, Tokyo, Japan

[73] Assignee: Nippon Kogaku K.K., Tokyo, Japan

[21] Appl. No.: 628,653

[22] Filed: Nov. 4, 1975

[30] Foreign Application Priority Data

Nov. 14, 1974 Japan .......................... 49-137060[U]

[51] Int. Cl.$^2$ ............................................ G03B 17/38
[52] U.S. Cl. .................................. 354/266; 200/67 G; 354/173
[58] Field of Search ............... 354/23 R, 50, 51, 60 R, 354/60 E, 60 L, 173, 266; 200/67 R, 67 E, 67 DA, 76, 78, 67 G

[56] References Cited

U.S. PATENT DOCUMENTS

| 3,169,460 | 2/1965 | Winkler et al. ...................... 354/173 |
| 3,481,262 | 12/1969 | Suzuki et al. ......................... 354/266 |
| 3,720,152 | 3/1973 | Uchiyama et al. .................. 354/60 R |
| 3,852,557 | 12/1974 | Brown ................................. 200/67 G |
| 3,947,857 | 3/1976 | Kiyoshi et al. ....................... 354/266 |
| 3,950,774 | 4/1976 | Mita et al. ............................ 354/266 |

Primary Examiner—Russell E. Adams
Attorney, Agent, or Firm—Shapiro and Shapiro

[57] ABSTRACT

A switch operating device for changing a switch from a first state to a second state at a first position of a reciprocating member during its stroke in one direction and for changing the switch from its second state to its first state at a different position during a reverse stroke of the reciprocating member. The reciprocating member may be the shutter release shaft of a camera, and the switch controlled by the operating device may be part of the circuit of a power-driven film advance mechanism. A safety device prevents improper operation of the switch.

9 Claims, 5 Drawing Figures

SWITCH OPERATING DEVICE OPERATIVELY ASSOCIATED WITH A RECIPROCALLY MOVABLE MEMBER

BACKGROUND OF THE INVENTION

Field of the Invention

This invention relates to a switch operating device operably associated with a reciprocally movable member, and more particularly to a switch operating device for controlling the operation of a power-driven film advance mechanism of a photographic camera.

SUMMARY OF THE INVENTION

According to the present invention, there is provided a switch operating device for changing the state of a switch comprising a member movable in opposite directions, means responsive to movement of the movable member in one direction to a first location for causing the switch to change state, and means responsive to movement of the movable member in the opposite direction to a second location different from the first location for causing the switch to change to another state.

The member movable in opposite directions may be a reciprocally movable shutter release shaft of a camera, the shaft being operatively associated with the shutter release button of a camera.

BRIEF DESCRIPTION OF THE DRAWINGS

An embodiment of the present invention is shown in the accompanying drawings wherein.

DESCRIPTION OF THE PREFERRED EMBODIMENT

For illustrative purposes, the invention is described with respect to a switch that controls the energization of a power-operated film advance mechanism for a photographic camera, but it should be apparent that the invention has applications beyond this particular one.

Figure 1:
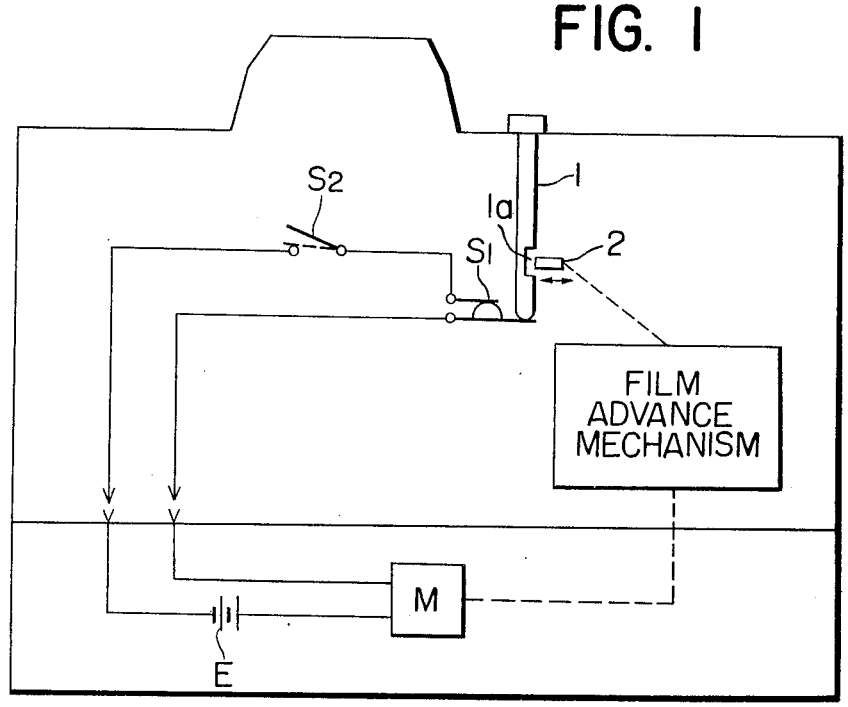
FIG. 1 is a schematic diagram of a photographic camera having a power-operated film advance mechanism, and showing a switch operated device according to the present invention.

FIG. 1 shows a camera associated with a power-operated actuator comprising motor M for operating a film advance mechanism (indicated diagrammatically) that effects film advance and shutter cocking operations, and power source E for energizing the motor through switches S1 and S2 connected in series. Switch S1 is operatively associated with shutter release shaft 1 so as to be opened during the depression stroke of shaft 1 and closed during the return stroke thereof. Depression of the release shaft 1 first opens the switch S1 and then releases the shutter. Switch S2 is closed in response to movement of the shutter to closed position, and is opened in response to the shutter cocking operation. When switch S1 closes upon the return stroke of shaft 1, switch S2 having been closed by reason of the shutter being in its closed position, motor M will be energized to effect shutter cocking and film advance operations. If it were possible to depress the release button and open switch S1 during the time the motor is energized and while film advance and shutter cocking is taking place, the motor would be de-energized before it completed its tasks. To avoid this situation, a safety lever 2 is provided which enters into a recess 1a in shaft 1 during and in response to the film advance operation, thereby preventing inadvertent depression of the release shaft during the film advance movement. Lever 2 is operatively associated with the film advance mechanism, so that at the end of the film advance and cocking operations lever 2 is retracted from the recess, allowing the release shaft to be depressed.

When the invention is used with a power-operated film advance mechanism, the following requirements must be satisfied:

1. Switch S1 must remain closed even if the release shaft is depressed by an amount corresponding to the clearance d (FIG. 2) between the safety lever and the top edge of recess 1a.
2. Switch S1 must open before release of the shutter, such release occurring as a result of depression of the release shaft.
3. Switch S1 must close only after shaft 1 has returned to a position in which recess 1a is aligned with safety lever 2.

These requirements must be satisfied to provide proper operation and to prevent damage to the components of the camera. If switch S1 opened upon depression of the release shaft by an amount corresponding to clearance d, the purpose of the safety lever would be defeated. If the shutter were released before switch S1 opened, the closing of switch S2 upon closing of the shutter would energize motor M, and film advance would be initiated while the release shaft 1 is still depressed, and the safety lever 2 is misaligned with the recess 1a. As a consequence, the safety lever would strongly impact the release shaft, thereby increasing the load and possibly damaging the motor, or the safety lever and release shaft. This would also be true if switch S1 closed before full return of the release shaft.

Figure 3:
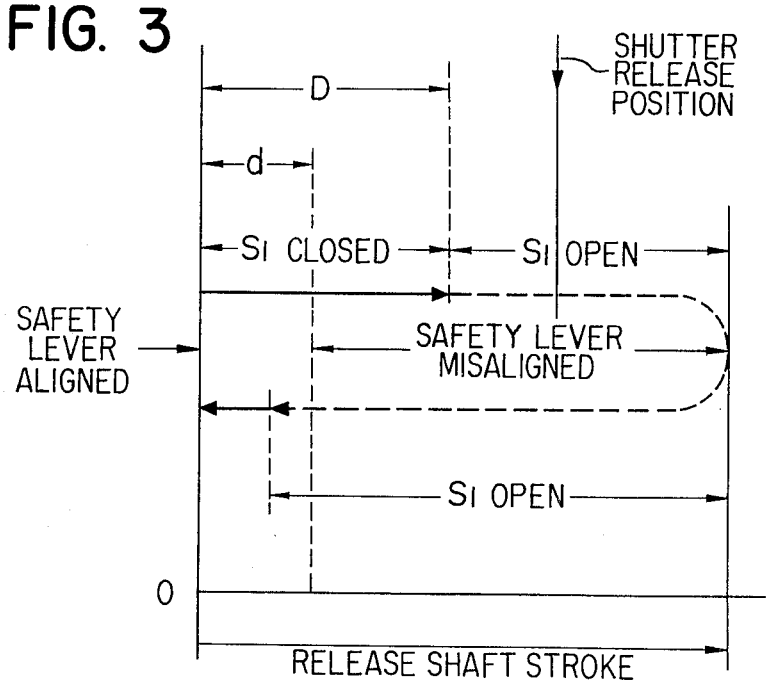
FIG. 3 is a diagram illustrating the relationship between the axial position of the release shaft during its forward and rearward movement, and the state of the controlled switch.

In order that all of the foregoing requirements may be satisfied, switch S1 must be operatively associated with the release shaft as shown in FIG. 3, so that the switch opens only after release shaft 1 on its forward stroke has reached a point at which the safety lever is misaligned with the recess in the shaft but before the shutter release occurs. In addition, the switch must close on the return stroke of the release shaft only after the recess in the shaft is aligned with the safety lever.

Figure 4:
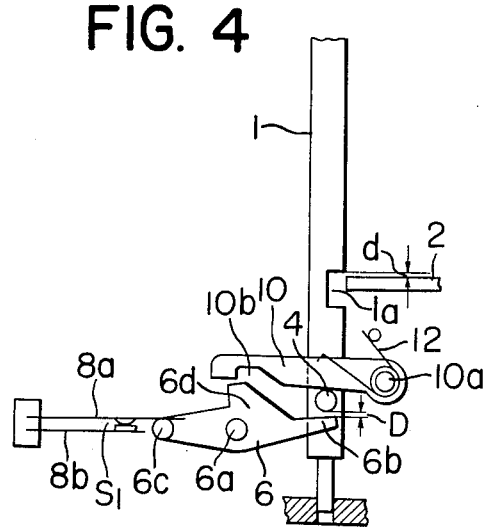
FIG. 4 is a view of a preferred embodiment of the present invention and showing the positions of the various components after a film advance has been completed and preparatory to making another exposure.
Figure 5:
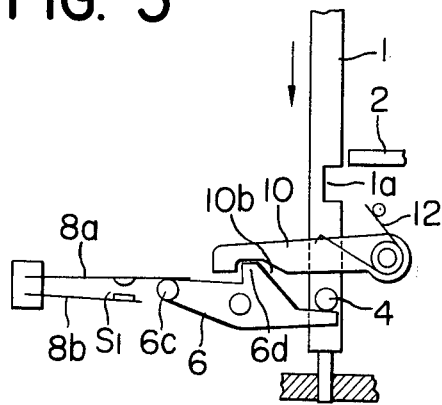
FIG. 5 is a view similar to FIG. 4 but showing the positions of the components when the release shaft has been depressed and the controlled switch has been opened.

FIGS. 4 and 5 disclose a switch operating device that satisfies the above conditions. FIG. 4 shows the relative position of the components of the device at the end of shutter cocking and film advance in preparation for taking another exposure. Release shaft 1 has a fixed pin 4 interposed between actuating lever 6, which is rotatably supported on a shaft 6a, and holding lever 10, which is pivotally mounted on shaft 10a. One end portion 6b of lever 6 extends into the path of pin 4, and the opposite end portion carries an insulating pin 6c engaged with contact arm 8a of switch S1. Arm 8a is resilient and biases lever 6 in a counterclockwise direction by reason of the engagement of the arm with pin 6c. End portion 6b and pin 4 are spaced apart from each other by a distance D which is greater than the previously mentioned clearance d, so that actuating lever 6 opens switch S1 only after pin 4 has moved downwardly through the distance D. Lever 10 is biased by spring 12 in a counterclockwise direction, and has a notch 10b adapted to receive projection 6d on lever 6 located intermediate ends 6b and 6c. The notch and projection define cooperable detent means.

Figure 2:
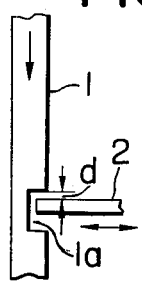
FIG. 2 is an enlarged view of a portion of FIG. 1 showing a release shaft and a safety lever cooperable therewith.

To effect shutter release, release shaft 1 is first depressed by an amount corresponding to D, whereby pin 4 engages end portion 6b and pivots the actuating lever clockwise against the biasing force of the contact arm 8a. As a consequence, pin 6c raises contact arm 8a (FIG. 5) out of engagement with the other contact arm 8b of switch S1, thus opening the switch. When this occurs, projection 6d seats in the notch 10b of holding lever 10. As the release shaft 1 is further depressed toward its axial position at which the shutter is released, pin 4 further pivots the actuating lever 6 clockwise, maintaining switch S1 in its open position. Release of the shutter occurs near the end of the stroke of the release shaft, and switch S2 (FIG. 1) closes when the shutter moves to its closed position. As the release shaft 1 begins to return to its normal position under the action of a spring (not shown), switch S1 is maintained in its open position because projection 6d of the actuating lever 6 remains captured in notch 10b of the holding lever. This arrangement exists until pin 4 engages lever 10, at which point recess 1a will be aligned with safety lever 2. After alignment has occurred, continued movement of the release shaft to its initial position causes pin 4 to rotate the holding lever 10 clockwise against the biasing force of spring 12, thereby unseating projection 6d from notch 10d and freeing lever 6, which pivots counterclockwise under the influence of contact arm 8a, engaged with pin 6c, allowing switch S1 to close. With the closing of switch S1 (switch S2 having been closed by the movement of the shutter to its closed position), motor M is energized to effect film advance and shutter cocking operations, and simultaneously, to seat the safety lever 2 in recess 1a as shown in FIG. 2. When film advance and shutter cocking operations are complete, the safety lever 2 is retracted from recess 1a to return the components to the position shown in FIG. 4.

It is thus seen that, during the forward stroke of release shaft 1, switch S1 is opened only after the release shaft has been displaced the distance D and pin 4 pivots lever 6 into releasable engagement with lever 10. During the return stroke of release shaft 1, switch S1 remains open until the release shaft has returned to its normal position at which pin 4 rotates lever 10 and releases lever 6. Therefore, during the reciprocation of the release shaft, a difference D is introduced between the axial positions of shaft 1 at which switch S1 opens and closes.

According to the present invention, the stroke position at which a switch is opened (or closed) by the forward stroke of a reciprocally movable member is different from the stroke position at which the switch is closed (or opened) by the backward movement of the reciprocating member.

I claim:

1. In a photographic camera having a power-operated film advance mechanism energized when the camera shutter is in its closed position upon the closing of a control switch, the closure of the control switch being controlled by a reciprocally movable member that releases the shutter of the camera only after the reciprocally movable member has been moved in one direction from an initial position and substantially beyond a predetermined location, a device for operating the control switch comprising:
   a. an actuating member operatively associated with the switch and having a first position in which the switch is maintained closed, but movable out of said first position for opening the switch;
   b. operating means for moving the actuating member out of its first position only when said reciprocally movable member has moved in said one direction to said predetermined location; and
   c. a holding member for holding the actuating member out of its first position until said reciprocally movable member returns in the opposite direction to substantially its initial position.

2. The invention according to claim 1, further comprising a safety device operatively engageable with the reciprocally movable member only when the latter is in its initial position for preventing movement of said reciprocally movable member in said one direction.

3. The invention of claim 2, wherein said safety device is controlled by said film advance mechanism.

4. A switch operating device for changing the state of a switch between an open state and a closed state in response to reciprocating movement of a reciprocally movable member comprising:
   a. an actuating member operatively associated with the switch and having a first position in which the switch is maintained in one of said states but being movable out of said first position for changing the state of the switch to the other state;
   b. operating means responsive to movement of the movable member in one direction to a first location for moving the actuating member out of its first position; and
   c. a holding member holding the actuating member out of its first position until the movable member returns in the opposite direction to a second location different from its first location.

5. A switch operating device according to claim 4, wherein said actuating member includes a first pivotal lever having detent means thereon and being engaged with the switch, and wherein the holding member includes a second pivotal lever resiliently urged toward the first lever, the second lever having detent means engageable with the detent means of the first lever when the latter is pivoted out of its first position for holding the first lever out of its first position; and the operating means includes a pin on the reciprocally movable member interposed betweeen the first and second levers and engageable with the first lever for pivoting the same when the reciprocally movable member moves in said one direction to said first location.

6. A switch operating device according to claim 4, wherein the reciprocally movable member is a shutter release shaft for releasing the shutter of a camera only after the shaft has been moved in said one direction beyond a predetermined displacement from an initial position in response to actuation of a shutter release button of the camera.

7. A switch operating device according to claim 6, wherein the switch remains closed until the release shaft moves in said one direction through a displacement less than said predetermined displacement, and remains open until the release shaft moves in the opposite direction to substantially said initial position.

8. A switch operating device according to claim 5, wherein said pin is engageable with said second lever for pivoting the same when the reciprocally movable member moves in said opposite direction to said second location.

9. A switch operating device according to claim 4, wherein said reciprocally movable member reaches said second location after passing said first location while moving in said opposite direction.

* * * * *